(12) United States Patent
Liang

(10) Patent No.: US 7,840,970 B2
(45) Date of Patent: Nov. 23, 2010

(54) GRAPHICAL USER INTERFACE COMPONENTS THAT INTERACT THROUGH A COLLABORATION SERVER

(75) Inventor: Zhilong Liang, Shanghai (CN)

(73) Assignee: SAP AG, Walldorf (DE)

( * ) Notice: Subject to any disclaimer, the term of this patent is extended or adjusted under 35 U.S.C. 154(b) by 915 days.

(21) Appl. No.: 11/604,124

(22) Filed: Nov. 22, 2006

(65) Prior Publication Data

US 2008/0120628 A1 May 22, 2008

(51) Int. Cl.
*G06F 3/048* (2006.01)
(52) U.S. Cl. .................. 719/329; 717/124; 717/125
(58) Field of Classification Search ............ 719/329
See application file for complete search history.

(56) References Cited

U.S. PATENT DOCUMENTS

| 5,313,581 | A | * | 5/1994 | Giokas et al. ............ 719/329 |
| 5,717,880 | A | * | 2/1998 | Imai et al. ............... 715/781 |
| 2006/0048165 | A1 | * | 3/2006 | Kautzleben et al. ...... 719/329 |

OTHER PUBLICATIONS

Burk, P.L., Jammin' on the Web—A New Client/Server Architecture for Multi-User Musical Performance. Proceedings of the International Computer Music Conference. International Computer Music Association. 2000. pp. 1-4.*

A.M. Memon; M.E. Pollack; M.L. Soffa. Hierarchical GUI Test Case Generation Using Automated Planning. IEEE Transactions on Software Engineering. vol. 27, Issue 2 (Feb. 2001). pp. 144-155.*
J. G. Yao, Effective Java GUI Automation on Multiple Platforms (Oct. 4, 2005). [retrieved from http://www.ibm.com/developerworks/rational/library/05/1004_yao/index.html on Nov. 10, 2009].*
Y. Sun; E.L. Jones. Specification-Driven Automated Testing of GUI-Based Java Programs. Proceedings of the 42nd Annual Southwest Regional Conference (ACMSE '04). Apr. 2-3, 2004. pp. 140-145.*
Apple Remote Desktop Administrator's Guide, Version 2.0 (May 12, 2004), pp. 93-103 [retrieved from http://images.apple.com/remotedesktop/pdf/ARD_Admin_Guide.pdf on May 21, 2010].*
Andreas Franke, Use IBM Rational Robot for effective functional testing of SAP GUI (May 10, 2005), [retrieved from http://www.ibm.com/developerworks/rational/library/05/510_sap/index.html on May 18, 2010].*

* cited by examiner

*Primary Examiner*—Hyung S Sough
*Assistant Examiner*—Brian Wathen

(57) ABSTRACT

A user interface (UI) collaboration system enables a plurality of application clients to collaborate in a heterogeneous environment. The system includes, but is not limited to, a server, a first application interface (API), and a second API. The first API is coupled to the server and is associated with a first application client that includes a first UI component. When an event is triggered by activation of a function of the first UI component, the first API reports the event to the server. The second API is coupled to the server and is associated with a second application client that includes a second UI component. The second API receives the event forwarded from the server to activate the second UI component. More than two application clients and APIs may also be included.

20 Claims, 7 Drawing Sheets

US 7,840,970 B2

GRAPHICAL USER INTERFACE COMPONENTS THAT INTERACT THROUGH A COLLABORATION SERVER

COPYRIGHT NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to a user interface design in computing. More particularly, this invention relates to a computing framework for collaborative development and testing of user interface components.

BACKGROUND

A user interface (UI) in computing generally refers to the graphical, textual, or auditory information a computer program presents to a user, and the control mechanism employed by the user to communicate with the computer program. A UI typically includes a plurality of UI components. For example, in a graphical user interface (GUI), a UI component is a group of graphical elements. The graphical elements include, but are not limited to, a button, a window, a panel, a dialog, and a combination of the above. The graphical elements, when grouped together to provide a specific function, form a UI component. For example, in MICROSOFT® Word, a UI component may be a menu bar, a status bar, or a writing area. Generally, different application programs include different UI components.

UI components are often inter-dependent. In the above example of MICROSOFT® Word, when a user moves a cursor in the writing area, the status bar tracks the cursor movement and shows the correct position of the cursor. The status bar updates the cursor position by receiving a message from the writing area, informing the status bar of the cursor movement. Thus, the operation of the writing area invokes the operation of the status bar and, therefore, there is a dependency between the writing area and the status bar.

Due to this inter-dependency, the development and testing of the UI components are often complex and time-consuming. It is difficult to separate the UI components and develop them in parallel. Moreover, due to the inter-dependency, the UI components are conventionally designed using the same programming language and under the same operating environment to ensure that inter-component messages are passed without errors. This results in the complexity, inflexibility, and inextensibility of the UI logic that implements the UI components.

If the UI components are written in different languages, under different operating systems, or run on different machines, it is very difficult to test these UI components simultaneously. For example, in a conventional system, it would be difficult to simultaneously test UI components written in different languages (such as JAVA, C++, and .Net). Similarly, it would also be difficult to simultaneously test UI components developed under different operating systems (such as Windows, LINUX, and Unix).

SUMMARY OF THE DESCRIPTION

A user interface (UI) collaboration system enables a plurality of application clients to collaborate in a heterogeneous environment. The system includes, but is not limited to, a server, a first application interface (API), and a second API. The first API is coupled to the server and is associated with a first application client that includes a first UI component. When an event is triggered by activation of a function of the first UI component, the first API reports the event to the server. The second API is coupled to the server and is associated with a second application client that includes a second UI component. The second API receives the event forwarded from the server to activate the second UI component. More than two application clients and APIs may also be included.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

A method and a system for user interface (UI) collaboration are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Figure 1:
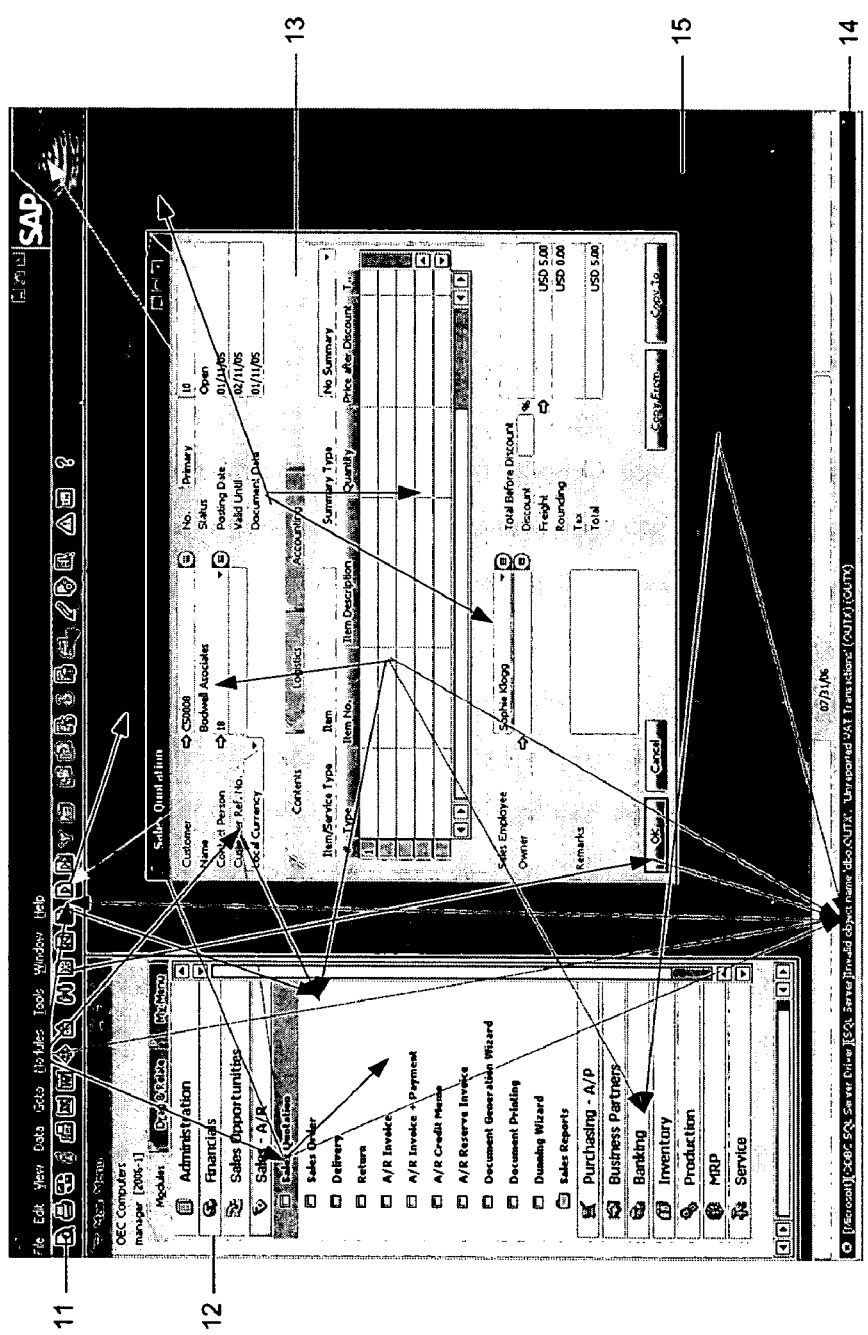
FIG. 1 diagram illustrating an example of a graphical user interface (GUI) displaying a plurality of inter-dependent user interface (UI) components.

FIG. 1 is graphical user interface (GUI) 10 showing a plurality of UI components and the inter-dependency thereof according to an embodiment of the invention. GUI 10 includes the UI components of a tool bar 11, a menu area 12, a form 13, a status bar 14, and a background 15. An arrow between two UI components indicates a dependency relationship between the UI components. That is, when the function of one UI component is invoked, the function of the other UI component is invoked as a result. A function of a UI component may be invoked, for example, by clicking on a button, changing the background, selecting from a menu, or other suitable actions. As shown in FIG. 1, a plurality of arrows exists among tool bar 11, menu area 12, form 13, status bar 14, and background 15. Thus, the development, testing, and execution of UI components 11-15 need to be coordinated such that inter-dependent functions of these UI components are properly executed. The above UI components are shown for illustration purposes only and different or additional components may be included.

Figure 2:
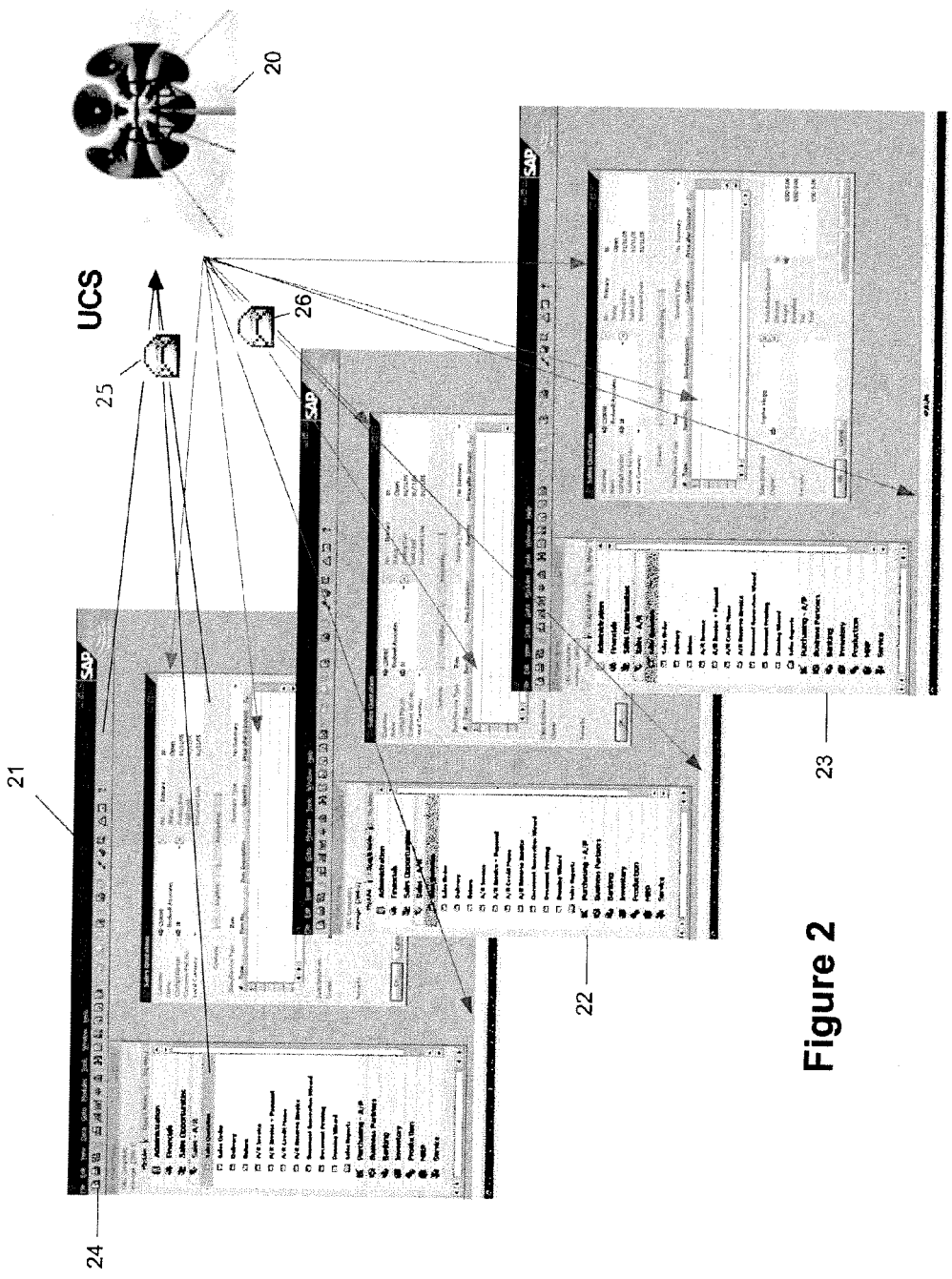
FIG. 2 is a diagram illustrating a user interface (UI) server that coordinates the interactions of the UI components according to an embodiment of the invention.

FIG. 2 is a diagram illustrating a UI collaboration server (UCS) 20 for coordinating the interactions among UI components according to an embodiment of the invention. Using UCS 20, UI components can be independently developed, in parallel, in heterogeneous environments. The term "heterogeneous environment" herein refers to different programming languages, different operating systems and/or different machine platforms. UI components can also be tested and executed in heterogeneous environments. In the example as shown, the UI components are tested in three UI applications 21, 22, and 23, each in a different environment. Each of the UI applications 21, 22, and 23 may be written in a different language, run under a different operating system, or executed on a different machine platform. When tool bar 24 in UI application 21 is invoked, a message 25 is sent to UCS 20 to notify the server of the event. UCS 20 identifies the other UI components having a dependency relationship with tool bar 24. UCS 20 then forwards the event in a message 26 to each of the identified UI components in UI applications 22 and 23. Thus, UCS 20 serves as a centralized event processing center for all the inter-dependent UI components. Each of the UI applications 21, 22, and 23 merely communicates with UCS 20 and no inter-application communication is necessary. Thus, the UI components become loosely-coupled but yet collaborate seamlessly through UCS 20. Again, the above UI components are shown for illustration purposes only and different or additional components may be included.

UCS 20 allows massive UI applications that include hundreds or more inter-dependent UI components to be tested substantially simultaneously in heterogeneous environments. For example, an application software may have a version that runs on Windows® and another version that runs on LINUX. A conventional system would require development of test tools on both Windows® platform and LINUX platform, and is therefore a waste of resources. With UCS 20, a user can connect the Windows® version and the LINUX version to the same UCS 20. When the Windows® version is tested, the LINUX version is automatically tested.

Figure 3:
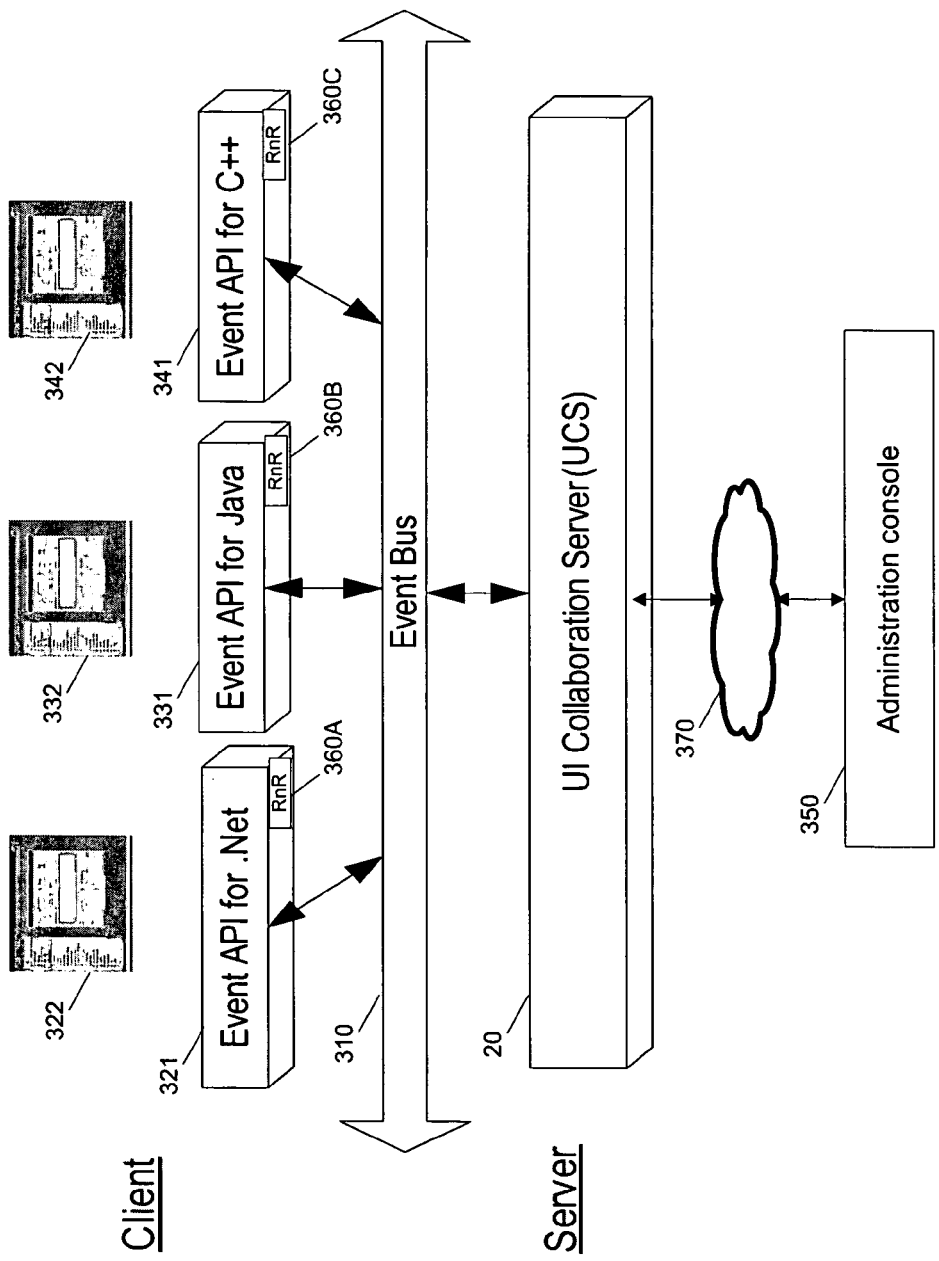
FIG. 3 is a block diagram illustrating a UI collaboration system according to an embodiment of the invention.

FIG. 3 is a block diagram illustrating an embodiment of a UI collaboration system 300 to coordinate the interactions among UI components, such as the interactions shown in FIG. 2. Referring to FIG. 3, system 300 includes UCS 20 of FIG. 2, an event bus 310, and one or more event application interfaces (APIs). Three event APIs 321, 331 and 341 are shown for illustration purposes. A plurality of UI application clients (322, 332, 342) is associated with event APIs (321, 331, 341). Each of UI application clients (322, 332, 342) includes one or more UI components, which may be written in any programming language, and developed and executed under any operating system and on any machine platform. For example, UI application client 322 may be written in .Net, UI application client 332 may be written in JAVA, and UI application client 342 may be written in C++. Each of event APIs (321, 331, 341) is written to communicate and operate with its associated UI application client (322, 332, 342). Each of the event APIs (321, 331, 341) is typically written in the same or a compatible language as its associated UI application client (322, 332, 342). Again, the components of system 300 are shown for illustration purposes only and other configurations may exist.

UI application clients (322, 332, 342) communicate with UCS 20 through event APIs (321, 331, 341). UI application clients (322, 332, 342) report events to UCS 20 and receive event notifications from UCS 20 through associated event APIs (321, 331, 341), respectively. Event APIs (321, 331, 341) are responsible for communication with UCS 20. With event APIs (321, 331, 341), UI application clients (322, 332, 342) do not need to know how and whether the events are delivered to UCS 20 and do not need to know where the events are reported. Thus, the UI logic that implements the UI components in UI application clients (322, 332, 342) is simple. The UI logic is also flexible in that each UI applicant clients (322, 332, 342) may be programmed to report any event, some events, or no event to UCS 20, independent of what is reported by the other UI applicant clients (322, 332, 342). Moreover, system 300 is extensible in that UCS 20 may communicate with any number of UI components in any number of UI application clients. Thus, system 300 can accommodate the development and testing of any given number of UI applicant clients (e.g., 1, 100, 1000, or more) in substantially the same manner.

Event APIs (321, 331, 341) are coupled to UCS 20 via event bus 310. Event bus 310 includes a network, e.g., the Internet, an intra-enterprise network, a local area network, a wide area network, or any suitable public or proprietary networks. Communications on event bus 310 conform to a network protocol, e.g., TCP/IP. Other protocols may also be used. Event bus 310 is responsible for the transportation of the events and ensures that the events are properly delivered to the proper destinations.

Event APIs (321, 331, 341) use a standard message exchange format when reporting events to UCS 20. The standard message exchange format may be in extensible markup language (XML) or other standard languages. Thus, when UCS 20 receives an event, the UCS forwards the event to destination UI components without parsing.

System 300 may also include an administration console 350 connected to UCS via a network 370, e.g., the Internet, an intra-enterprise network, a local area network, a wide area network, or any suitable networks. In one embodiment, administration console 350 is a web-based tool provided by system 300 to send messages to any UI application client (322, 332, 342). Using a web browser provided by administration console 350, a user can remotely control the testing of UI components in UI application client (322, 332, 342).

Event API (321, 331, 341) may include Record-and-Replay (RnR) mechanisms (360A, 360B, 360C), respectively, to allow past operations to be recorded and replayed Record and Replay (RnR) mechanisms 360A-C record a sequence of commands for testing UI application clients (322, 332, 342), respectively, and replay the command sequence when the same test is repeated. A system administrator does not need to manually enter the same commands each time the same functions are tested. Thus, RnR mechanisms 360A-C allow automated testing of massive UI application clients.

UCS 20 can serve one UI application client in a standalone mode, or multiple UI application clients at the same time. UCS 20 may switch from one mode to another as necessary without any code change. In the collaboration mode, UCS enables massive clients to work in parallel, thus reducing the cost of development and testing.

UCS 20 allows information sharing over event bus 310 among UI application clients (322, 332, 342). The shared information includes, but is not limited to, data (e.g., text, voice, application, etc.) and events (e.g., clicking on a menu, changing the background, etc.). Thus, a user may use UCS 20 to develop net meeting and web conferencing using the data sharing function of the UCS. Further, using the event sharing function of UCS 20, a user may minimize dependencies of UI components, and build an application that is easy to develop, maintain, and extend.

UI application clients (322, 332, 342) may reside on the same machine or on multiple machines. UCS 20 may reside on any of the machines on which UI application clients (322, 332, 342) reside, or on a different machine. UCS 20 may be used in the entire life cycle of system 300, including development, testing, and runtime. The information exchanged during the entire lifecycle of system 300 is in the same format. No new information needs to be added for runtime operations. Note that configuration 300 is described for illustration purposes only. Other configurations may exist. For example, techniques described throughout this application may be applied to a peer-to-peer network configuration, where a server may or may not be involved.

Figure 4:
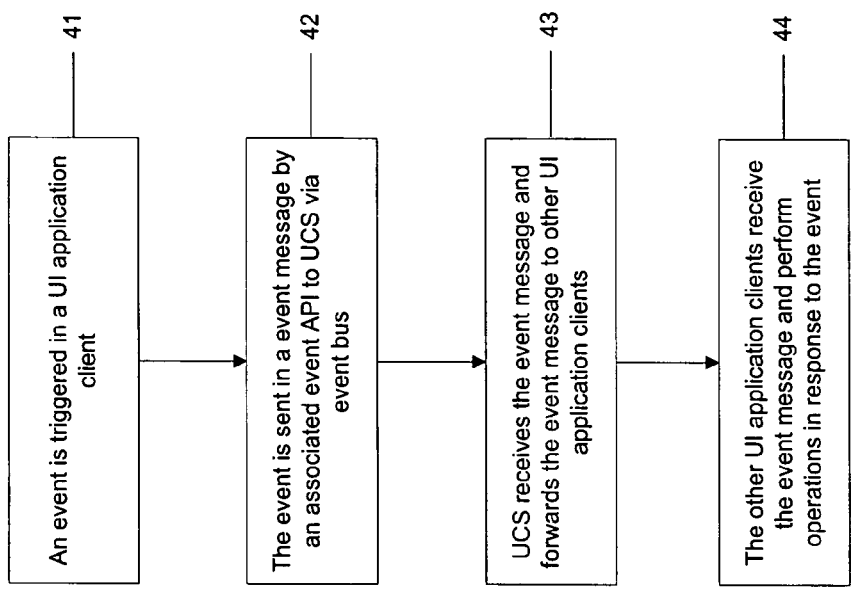
FIG. 4 is a flowchart illustrating operations of the UI collaboration system according to an embodiment of the invention.

FIG. 4 is a flowchart illustrating an embodiment of operations performed by a UI collaboration system, e.g., UI collaboration system 300 of FIG. 3. Note that process as shown in FIG. 4 may be performed by processing logic which may include software, hardware, or a combination of both. At block 41, an event is triggered in a UI application client. The event is caused by activating a UI component in the UI application client during testing, runtime, or other developmental or operational lifecycle of the system. At block 42, the event is sent in an event message to UCS 20 via event bus 310 using a standard message exchange format. The event message is sent by an event API associated with the UI application client that reports the event. At block 43, UCS 20 receives the event message and forwards the event message to other application clients on event bus 310 that are interested in the event. UCS 20 is informed of the application clients interested in an event prior to the occurrence of that event. An application client may be interested in any event or no event at all. As the event is reported in a standard message exchange format, UCS 20 does not parse the event message. At block 44, the other UI components receive the event message and functions related to the reported event are activated in response to the event. Thus, UI application clients can be independently developed in parallel and tested substantially simultaneously. The above operations may be performed during a test or at runtime. Additional operations may also be performed.

Figure 5:
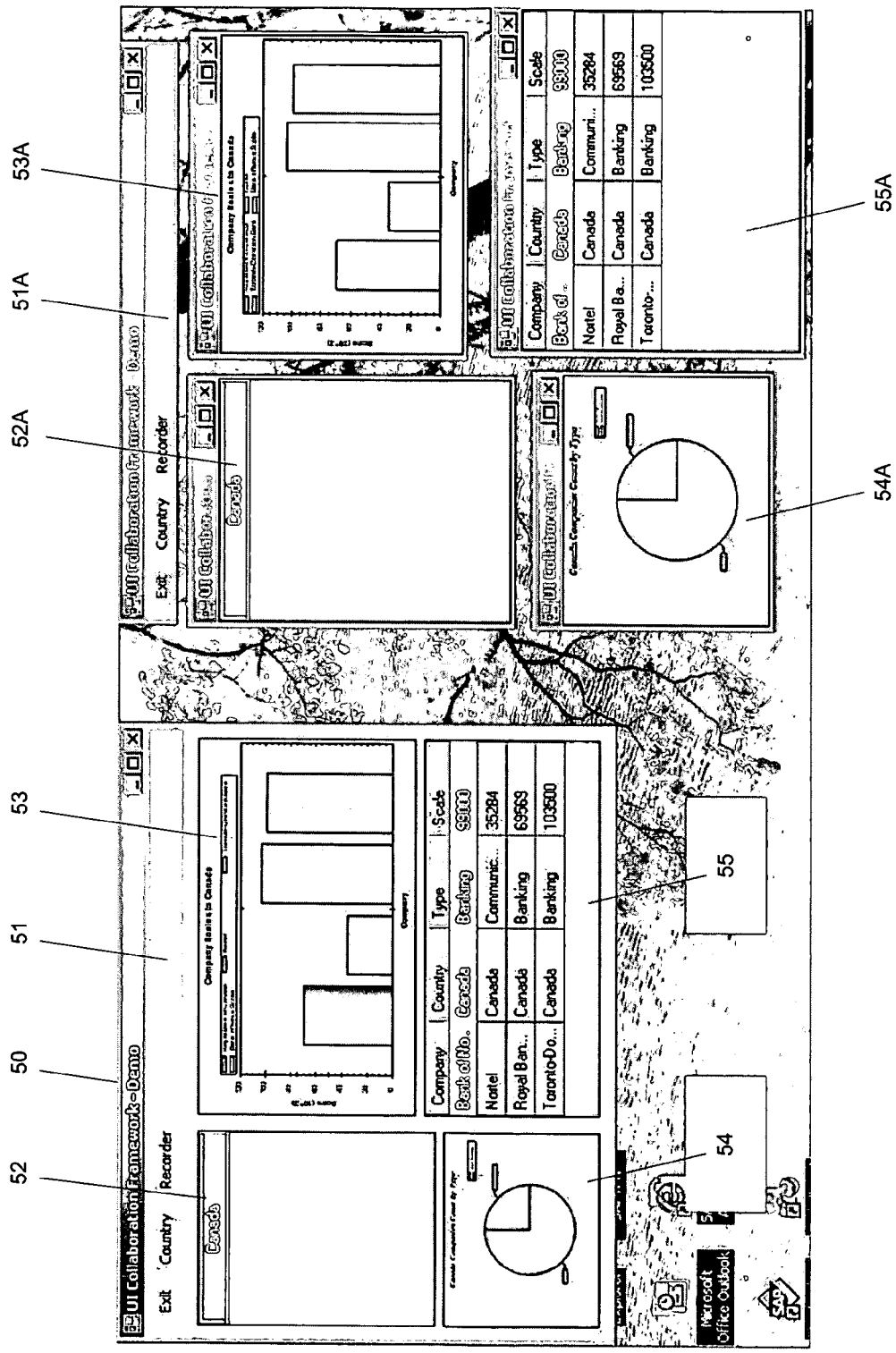
FIG. 5 is a GUI illustrating independently developed UI components according to one embodiment of the invention.

UI collaboration system 300 allows the UI components to be independently developed in parallel. FIG. 5 is a GUI illustrating independently developed UI components according to one embodiment of the invention. The GUI shows a window 50 including UI components of a tool bar 51, a menu 52, a bar diagram 53, a pie chart 54, and a table 55. UI components 51-55 are loosely-coupled and developed in parallel in separate UI application clients, as shown on the right as 53A-55A. Each of UI application clients 53A-55A may use a different programming language, run under a different operating system, and/or execute on a different platform. UI application clients 53A-55A do not communicate with each other directly. Rather, they report events to a UCS via an event bus, e.g., UCS 20 and event bus 310 as shown in FIG. 3. If a UI component is developed before the other dependent UI components, the UI component will operate and be tested even without the existence of the other dependent UI components.

Figure 6:
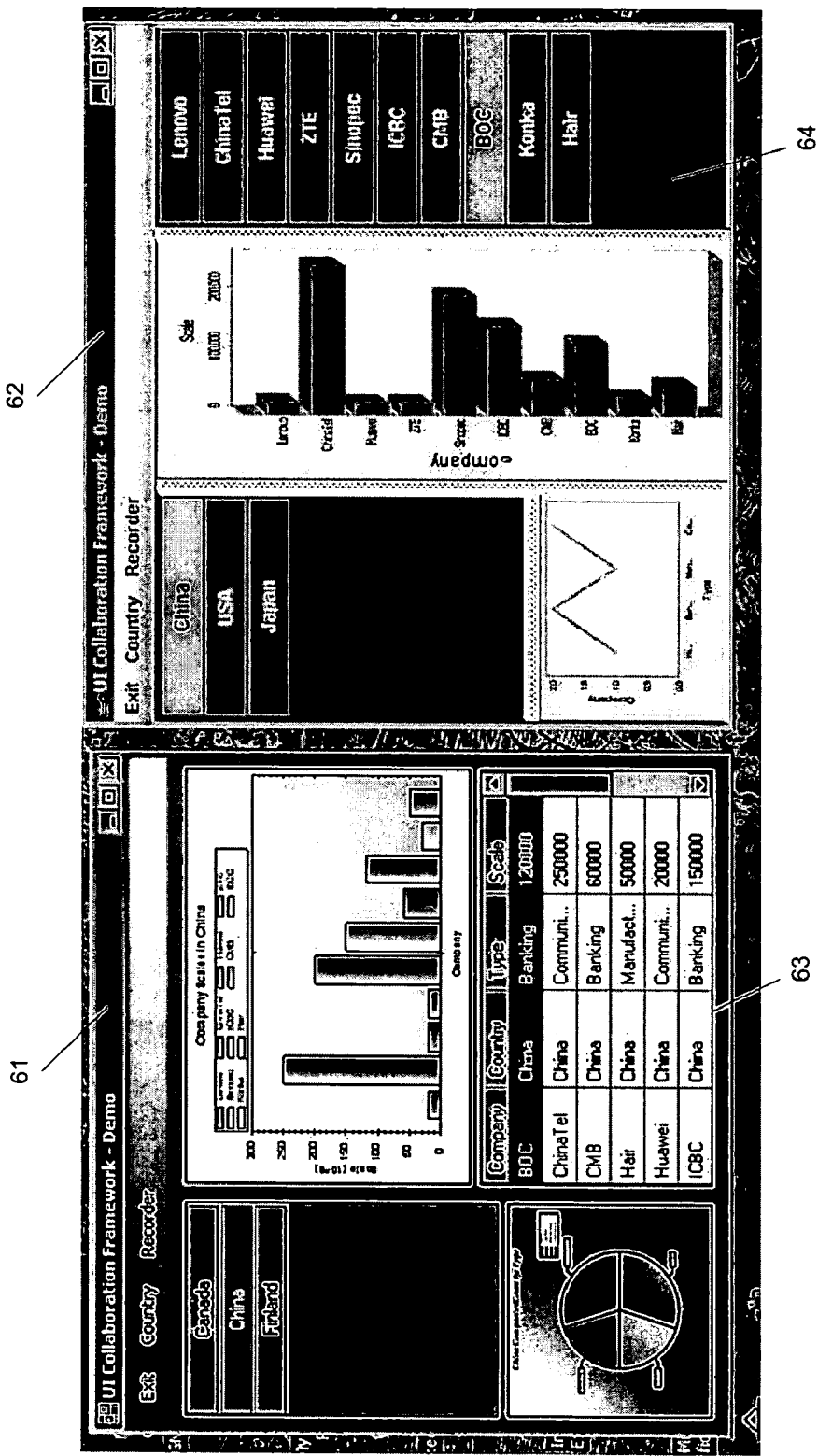
FIG. 6 is a GUI illustrating that UI components of two different applications are tested substantially simultaneously.

UI collaboration system 300 also allows multiple UI components to be tested substantially simultaneously. FIG. 6 is a GUI illustrating the testing of two client applications 61 and 62 substantially simultaneously according to one embodiment of the invention. In client application 61, BOC (Bank of China) is selected from table 63. The selection of BOC triggers an event, which causes an entity list 64 in client application 62 to be highlighted. This is because table 63 and entity list 64 are inter-dependent UI components. Thus, when the selection of table 63 is invoked, the highlighting of entity list 64 is automatically tested. It is understood that the above operations are for illustration purpose only. The function of table 63 may be inter-dependent on more than one UI components in other client applications. Thus, when the function of table 63 is activated, the functions of the other inter-dependent client applications are automatically activated. Each of UI application clients 61 and 62 may use a different programming language, run under a different operating system, and/or execute on a different platform. Automatic activation of these inter-dependent functions allows massive applications in heterogeneous environments to be tested substantially simultaneously and thus greatly increase the efficiency of the test.

Figure 7:
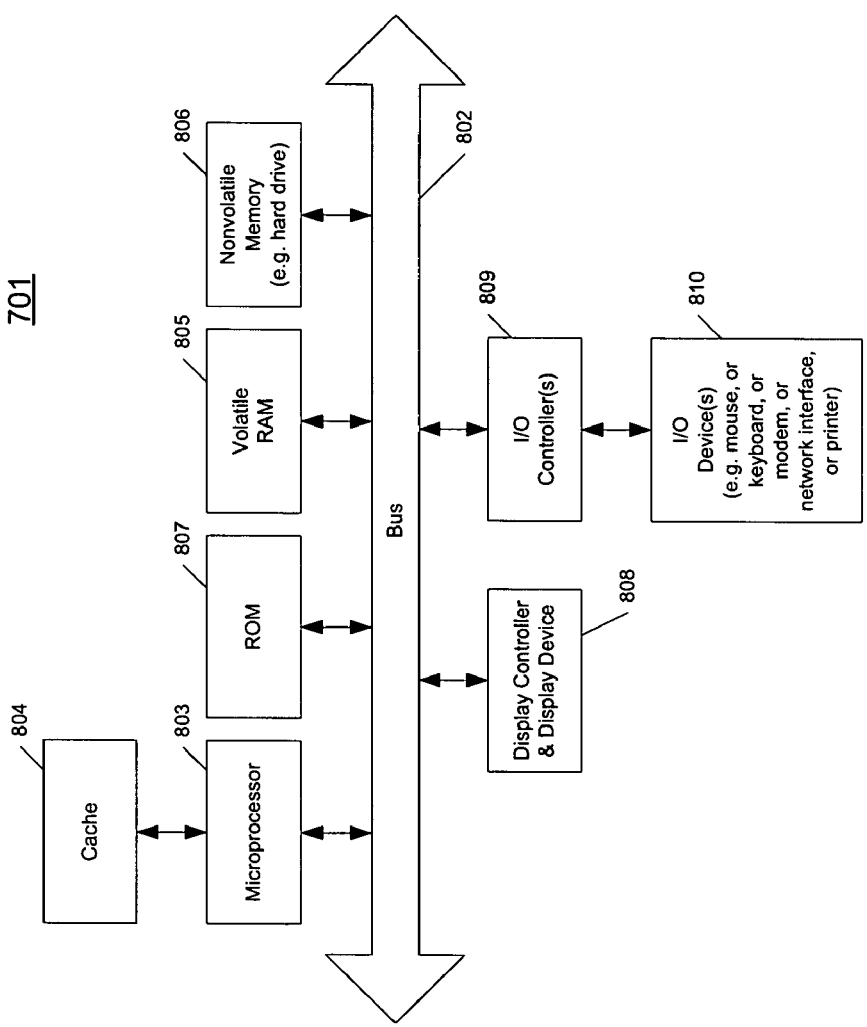
FIG. 7 is a block diagram illustrating a data processing system that may be used as an embodiment of the invention.

FIG. 7 is a block diagram of a digital processing system 701, which may be used with one embodiment of the invention. For example, system 701 may be used as UI collaboration system 300 of FIG. 3.

Note that while FIG. 7 illustrates various components of a computer system, it is not intended to represent any particular architecture or manner of interconnecting the components, as such details are not germane to the present invention. It will also be appreciated that network computers, handheld computers, cell phones and other data processing systems which have fewer components or perhaps more components may also be used with the present invention.

As shown in FIG. 7, system 701, which is a form of a data processing system, includes a bus or data interconnect 802 which is coupled to one or more microprocessors 803 and a ROM 807, a volatile RAM 805, and a non-volatile memory 806. The microprocessor 803, which may be, for example, a PowerPC processor or an Intel Pentium processor, is coupled to cache memory 804 as shown in the example of FIG. 8. The bus 802 interconnects these various components together and also interconnects these components 803, 807, 805, and 806 to a display controller and display device 808, as well as to input/output (I/O) devices 810, which may be mice, keyboards, modems, network interfaces, printers, and other devices which are well-known in the art.

Typically, the input/output devices 810 are coupled to the system through input/output controllers 809. The volatile RAM 805 is typically implemented as dynamic RAM (DRAM) which requires power continuously in order to refresh or maintain the data in the memory. The non-volatile memory 806 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 7 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 802 may include one or more buses connected to each other through various bridges, controllers, and/or adapters, as are well-known in the art. In one embodiment, the I/O controller 809 includes a USB (Universal Serial Bus) adapter for controlling USB peripherals. Alternatively, I/O controller 809 may include an IEEE-1394 adapter, also known as FIREWIRE adapter, for controlling FIREWIRE devices.

Thus, a user interface (UI) collaboration system has been described herein. Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a JAVA Virtual Machine), an interpreter, a Common Language Runtime, a high-level language virtual machine, etc.)), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

It is believed that processes taught by the discussion above may also be described in source level program code in various object-orientated or non-object-orientated computer programming languages (e.g., JAVA, C#, VB, Python, C, C++, J#, APL, Cobol, ABAP, Fortran, Pascal, Perl, etc.) supported by various software development frameworks (e.g., Microsoft Corporation's .NET, Mono, JAVA, Oracle Corporation's Fusion, etc.). The source level program code may be converted into an intermediate form of program code (such as JAVA byte code, Microsoft Intermediate Language, etc.) that is understandable to an abstract execution environment (e.g., a JAVA Virtual Machine, a Common Language Runtime, a high-level language virtual machine, an interpreter, etc.), or a more specific form of program code that is targeted for a specific processor.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method of a user interface (UI) collaboration system, the method comprising:
    displaying a plurality of graphical UI components, each of which is developed in a different programming language and runs under a different operating system, the graphical UI components comprising one or more of a tool bar, a menu, a bar diagram, a pie chart and a table, the graphical UI components comprising a first graphical UI component provided by a first application client in a first display window and a second graphical UI component provided by a second application client in a second display window; and
    controlling, by an administration console of the UI collaboration system, testing of the graphical UI components;
    wherein controlling the testing comprises:
        causing the first graphical UI component to be selected to trigger an event;
        receiving, by a server, the event from the first application client and identifying the second graphical UI component which is dependent on the first graphical UI component; and
        forwarding the event by the server to the second application client to test activating the second graphical UI component.

2. The method of claim 1 wherein receiving the event by the server comprises:
    receiving the event by the server through an application interface (API) designed for the first application client, the API using a standard message exchange format to report the event.

3. The method of claim 1, wherein the first graphical UI component and the second graphical UI component are concurrently shown in two different display windows.

4. The method of claim 1 further comprising:
    activating a function of the first graphical UI component from a remote console using a web browser.

5. The method of claim 1 wherein controlling the testing further comprises:
    recording a test sequence, the test sequence including a sequence of commands that triggers test events; and
    replaying the test sequence.

6. The method of claim 1 further comprising:
    independently developing the first graphical UI component and the second graphical UI component in heterogeneous environments.

7. The method of claim 1 further comprising:
    forwarding the event by the server to a plurality of application clients to activate related functions of the plurality of application clients.

8. A user interface (UI) collaboration system, the system comprising:
    one or more displays that show a plurality of graphical UI components, each of which is developed in a different programming language and runs under a different operating system, the graphical UI components comprising one or more of a tool bar, a menu, a bar diagram, a pie chart and a table, the graphical UI components comprising a first graphical UI component provided by a first application client in a first display window and a second graphical UI component provided by a second application client in a second display window, the second graphical UI component being dependent on the first graphical UI component;
    an administration console to control testing of the UI components, wherein the testing causes the first graphical UI component to be selected to trigger an event;
    a server coupled to the administration console;
    a first application interface (API) coupled to the server and associated with the first application client, the first API to report the event to the server; and
    a second API coupled to the server and associated with the second application client, the second API to receive the event forwarded from the server to test activation of the second graphical UI component.

9. The system of claim 8 wherein the first API uses a standard message exchange format for a message that reports the event.

10. The system of claim 8 wherein the administration console remotely controls the activation using a web browser.

11. The system of claim 8 further comprising:
a record-and-replay unit to record a test sequence and replay the test sequence, the test sequence including a sequence of commands that trigger test events.

12. The system of claim 8 further comprising:
a plurality of APIs coupled to the server, each of the plurality of APIs serving as an interface between the server and an associated application client that includes at least one UI component.

13. The system of claim 8 further comprising:
an event bus to couple the server with the first API and the second API.

14. The system of claim 8, wherein the first graphical UI component and the second graphical UI component are independently developed in heterogeneous environments.

15. A machine-readable non-transitory storage medium having instructions, when executed, cause a machine to perform a method of a user interface collaboration system, the method comprising:
displaying a plurality of graphical UI components, each of which is developed in a different programming language and runs under a different operating system, the graphical UI components comprising one or more of a tool bar, a menu, a bar diagram, a pie chart and a table, the graphical UI components comprising a first graphical UI component provided by a first application client in a first display window and a second graphical UI component provided by a second application client in a second display window; and
controlling, by an administration console of the UI collaboration system, testing of the graphical UI components;
wherein controlling the testing comprises:
causing the first graphical UI component to be selected to trigger an event;
receiving, by a server, the event from the first application client and identifying the second graphical UI component which is dependent on the first graphical UI component; and
forwarding the event by the server to the second application client to test activating the second graphical UI component.

16. The machine-readable non-transitory storage medium of claim 15, wherein receiving the event by the server comprises:
receiving the event by the server through an application interface (API) designed for the first application client, the API using a standard message exchange format to report the event.

17. The machine-readable non-transitory storage medium of claim 15, wherein the first graphical UI component and the second graphical UI component are concurrently shown in two different display windows.

18. The machine-readable non-transitory storage medium of claim 15, wherein the method further comprises:
activating a function of the first graphical UI component from a remote console using a web browser.

19. The machine-readable non-transitory storage medium of claim 15, wherein the controlling the testing further comprises:
recording a test sequence, the test sequence including a sequence of commands that triggers test events; and
replaying the test sequence.

20. The machine-readable non-transitory storage medium of claim 15, wherein the method further comprises:
independently developing the first graphical UI component and the second graphical UI component in heterogeneous environments.

\* \* \* \* \*